Patented June 6, 1939

2,160,900

UNITED STATES PATENT OFFICE 2,160,900

METHOD FOR VAPOR CLEARING

Clellan Ross Pleasants, San Francisco, Calif.

No Drawing. Application April 23, 1934,
Serial No. 721,969

6 Claims. (Cl. 252—1)

This invention relates to a method for clearing and condensing vapors such as clearing away fog or any other water vapors from air or other gases.

An object of the invention is to provide a compound which when burned frees such gases of combustion that suitably react with the condensed drops of water vapor present in the surrounding air or gaseous substance to be cleared to either evaporate or lift the water vapor thereby dispelling fog, frost, or the like phenomena of the air near the ground.

Another object of the invention is to provide a method whereby fog, or frost or any water vapor is either rapidly precipitated or evaporated so as to clear the atmosphere, or other gaseous substance from said vapor.

It is a well known fact that ordinarily the atmosphere consists chiefly of nitrogen and oxygen. In addition there is in the air a small fairly constant proportion of carbon dioxide, almost negligible proportions of ammonia, and the oxides of nitrogen, and a small percentage of certain inert gases, such as argon, etc. There is a varying proportion of water vapor in the atmosphere. While the humid lower air stratum near the ground is warm the water vapor remains in gas form, but if for any reason the relatively humid warm air is cooled below its so called "dew point" the vapor condenses around small particles called "condensation nuclei" and remains suspended in the air to form fog or frost and the like. There are many types of fogs and frost, but the quantity of water in a fog or frost is extremely small, and even that is distributed into extremely large number of small particles in a large volume of air.

To dispel these condensed fog particles I make use of a compound formed by mixing carbohydrates, or a mixture of hydrocarbons either liquid or gaseous, with chlorine preferably to a point of saturation. This may be accomplished by using gasoline, kerosene, coal oil, mineral or vegetable oil or their mixtures, and preferably injecting chlorine gas into the mixture but in some cases chloride of lime may be added to the liquid or gas used. There occurs an immediate and rapid reaction whereby the chlorine mixes with the liquid hydrocarbon mixtures. If chloride of lime is used, then the chlorinated mixture of hydrocarbons is drawn off the lime. Then the resulting chlorinated product or compound is ignited in any suitable manner. The gases of combustion created by the burning mixture are liberated into the atmosphere or gaseous substance to be cleared.

The process or method of dispelling fog or frost therefore involves the mixing of chlorine with a mixture of hydrocarbons or carbohydrates, and then igniting the resultant, preferably saturated, mixture. Whether the mixture explodes or burns slowly, according to actual experiments, the result is the same, namely the gases of combustion expand rapidly and wherever the gas expands the condensed water vapor disappears, the smoke or fumes also disappear almost instantly and fog or frost is dispelled in comparatively large volumes of atmosphere.

The operation is to be repeated in accordance with wind velocity and density or height of fog.

There are various theories offered for the explanation of the reaction of the above gases with the drops of condensed water vapor forming the fog or frost. One theory is that the burnt gas and chlorine mixture reacts with the small water drops to form a volatile mixture with the water or evaporate it rapidly. In some cases it might precipitate the water drops out of the air and considering the relatively small amount of water involved the precipitation may be hardly noticeable yet considerable volume of air cleared.

Another explanation offered is the deionization of the air or moisture particles by the reaction with the gases of combustion thereby lowering the dew point of the air. Experiments heretofore performed show the ultimate, beneficial result, namely the disappearance of condensed water vapor.

I performed the above method on sufficient scale to prove its utility and practicability. Although the exact nature of the chemical or electronic reaction occurring during the method is not yet clearly understood, nevertheless the method can be carried out on a commercial scale in its present form.

There are several other uses for this method in addition to the mere clearing of fog over a given area. For instance in orchards where at present smudge pots are used for the protection of fruit against frost, a pipe line discharging the aforedescribed gases of combustion may be laid in the orchard and caused to discharge the gases at will and at predetermined points. Also the mixture may be released in form of bombs or the like from airplanes, or discharged from tanks on airplanes like a smokescreen and dispel the fog over an area above a landing field for landing, or for observation purposes or to locate bearings or to clear passenger plane lanes, or it may be discharged from ships or boats for the purpose of clearing ship lanes, channels or harbors. The gases produced from the above mixture would be very efficient in clearing the atmosphere over observatories.

It is to be noted that the above method is harmless. It does not leave any fumes or poisonous gases in the lower stratum of the air yet efficiently accomplishes the dispelling of fog or frost or the like.

Having thus described my invention what I claim and desire to secure by Letters Patent is:

1. The method of freeing air or other gases from condensed vapor particles comprising the burning of a hydrocarbon mixture containing chlorine, and introducing the gases created by said burning into atmosphere to react with said vapor particles.

2. The method of clearing air from condensed water vapor comprising the introducing in the air of a gas created by the burning of a saturated mixture of chlorine and a hydrocarbon.

3. The method of dispelling condensed atmospheric water vapor comprising the burning of a compound containing carbon the gaseous products of which tend to occupy a very large volume in comparison to the original compound, in the presence of chlorine, and the expanding of said gases into the atmosphere.

4. A method of dispelling fog comprising the burning of a hydrocarbon containing chlorine so as to discharge the gases of combustion into said fog.

5. The process of dispelling fog or mist which consists the igniting of a combustible mixture containing carbon in the presence of chlorine and projecting the gases of combustion into the fog or mist.

6. The process of dispelling fog or mist which consists the burning of a combustible mixture of chlorine and hydrocarbons, and projecting the resulting gases of combustion into the fog or mist.

CLELLAN ROSS PLEASANTS.